United States Patent
Mononen

(10) Patent No.: US 10,407,866 B2
(45) Date of Patent: Sep. 10, 2019

(54) DEVICE FOR FILLING A BUCKET

(71) Applicant: TEKNO-TUOTE S MONONEN, Kontiolahti (FI)

(72) Inventor: Sakari Mononen, Kontiolahti (FI)

(73) Assignee: TEKNO-TUOTE S MONONEN, Kontiolahti (FI)

( * ) Notice: Subject to any disclaimer, the term of this patent is extended or adjusted under 35 U.S.C. 154(b) by 0 days.

(21) Appl. No.: 15/766,568

(22) PCT Filed: Oct. 10, 2016

(86) PCT No.: PCT/FI2016/050707
§ 371 (c)(1),
(2) Date: Apr. 6, 2018

(87) PCT Pub. No.: WO2017/060571
PCT Pub. Date: Apr. 13, 2017

(65) Prior Publication Data
US 2018/0313058 A1    Nov. 1, 2018

(30) Foreign Application Priority Data

Oct. 8, 2015 (FI) ...................................... 20150282

(51) Int. Cl.
*E02F 3/64* (2006.01)
*E02F 3/34* (2006.01)
(Continued)

(52) U.S. Cl.
CPC ............ *E02F 3/6418* (2013.01); *B60P 1/286* (2013.01); *B60P 1/34* (2013.01); *E02F 3/342* (2013.01);
(Continued)

(58) Field of Classification Search
CPC ..................................................... B60P 1/286
See application file for complete search history.

(56) References Cited

U.S. PATENT DOCUMENTS 3,052,996 A * 9/1962 Holopainen .............. E02F 3/60
37/398
3,203,564 A * 8/1965 Brekelbaum .......... E02F 3/3411
414/702
(Continued)

FOREIGN PATENT DOCUMENTS

| CN | 102191781 A | 9/2011 |
|---|---|---|
| DE | 10 2012 021 088 A1 | 4/2014 |
| FR | 2 714 090 A1 | 6/1995 |

OTHER PUBLICATIONS

International Search Report (PCT/ISA/210) dated Jan. 11, 2017, by the Finnish Patent and Registration Office as the International Searching Authority for International Application No. PCT/FI2016/050707.

(Continued)

*Primary Examiner* — Ronald P Jarrett
(74) *Attorney, Agent, or Firm* — Buchanan, Ingersoll & Rooney PC

(57) ABSTRACT

The disclosure relates to a device for filling a bucket in a loading and transport device having a rear part of a frame structure with articulated arms rotatable by power units, and second arms attached by pivots to a bucket which is in a transport position rotatable by power units around pivots to an emptying position. A middle part of the bucket bottom is connected by pivots with a panel having rotatable arms. The panel is rotatable around pivots and is arranged to lift and shift material on top of the panel to the rear part of the bucket, after which, the front part of the bucket bottom is empty and the bucket is fillable by pushing forward and rotatable around a horizontal shaft such that a center of gravity of the bucket transfers onto a wheelbase of the loading and transport device.

9 Claims, 5 Drawing Sheets

(51) Int. Cl.
| | |
|---|---|
| *B60P 1/28* | (2006.01) |
| *B60P 1/34* | (2006.01) |
| *E02F 3/342* | (2006.01) |
| *E02F 3/40* | (2006.01) |
| *E02F 3/65* | (2006.01) |
| *B60P 1/16* | (2006.01) |

(52) U.S. Cl.
CPC ............ *E02F 3/3417* (2013.01); *E02F 3/402* (2013.01); *E02F 3/656* (2013.01); *E02F 3/657* (2013.01); *B60P 1/16* (2013.01); *B60P 1/28* (2013.01)

(56) References Cited

U.S. PATENT DOCUMENTS

| | | |
|---|---|---|
| 3,917,089 A | 11/1975 | Eriksson |
| 3,945,519 A | 3/1976 | Eriksson |
| 3,985,250 A | 10/1976 | Mononen |
| 4,130,209 A | 12/1978 | Mononen |

OTHER PUBLICATIONS

Written Opinion (PCT/ISA/237) dated Jan. 11, 2017, by the Finnish Patent and Registration Office as the International Searching Authority for International Application No. PCT/FI2016/050707.
Finnish Search Report dated Jun. 7, 2016, issued by the Finnish Patent Office in the corresponding Finnish Patent Application No. 20150282. (1 page).

* cited by examiner

DEVICE FOR FILLING A BUCKET

This application is a national phase application of International Patent Application No. PCT/FI2016/050707 filed on Oct. 10, 2016.

BACKGROUND OF THE INVENTION

The invention relates to a device for filling particularly a large-sized bucket in a loading and transport device, into the rear part of a frame structure of which are articulated arms rotatable around a horizontal shaft by power units, to other arms is connected a bucket by pivots such that, when the arms have been pulled into a transport position with power units, the bucket is rotatable around pivots by power units into an emptying position.

Previously are know large-sized buckets which have been presented e.g. in U.S. Pat. Nos. 3,985,250 and 4,130,209. It is not possible to fill the buckets according to these specifications full of their rear part by the machine's own thrust because, even though the bucket were sometimes rotated to its upper position to shift material to the rear part of the bucket, when lowering the bucket again to the loading position, the material rolls back to the tip part of the bucket and prevents new material from accessing the bucket.

Recent self-loading machines, such as e.g. wheel loaders, which are provided with a bucket fillable by pushing have small loading and transport capabilities. It is only about a third of the dead weight of the machine in relation to the machine size so such a bucket can be filled by pushing but a larger bucket in relation to the machine size cannot be used because, as the centre of gravity of the bucket is outside the wheelbase, the rear end of the machine will lift up. The loading and transport volume of material remains small.

Previously is also know a device presented in patent specification FR2714090 the disadvantage of which is that a panel shifting material and its arms are articulated in the top part of the bucket, whereby the addition in material quantity to the bucket provided by the panel is very small as the material shifts to the bucket already by pushing the bucket as one layer. The device according to the specification cannot shift material pushed to the bucket and scooped by the panel anywhere from the bottom plane of the bucket but it remains in one layer. This again limits the amount of material and thus the productivity low.

OBJECT OF THE INVENTION

An object of this invention is to introduce a novel device for filling a bucket which device does not incur the above-mentioned disadvantages. Furthermore, an object of the invention is to provide a device for filling a bucket, by means of which device, the bucket can be loaded full.

DESCRIPTION OF THE INVENTION

The device according to the invention provides a crucial improvement to the above disadvantages.

According to the invention, in the middle part of the bottom of the whole bucket is connected by pivots a panel to the bottom edge of which are fastened arms which are rotatable by power units such that, the panel being against the bucket bottom, material shifts when pushing the bucket forward without obstacles to the bucket, the bucket being most suitably half-way full, the panel is rotatable by means of the power units around the pivots substantially to the middle of the bucket, whereby it is arranged to lift and shift the material being on top of the panel to the rear part of the bucket, after which, the front part of the bucket bottom is empty. Furthermore, the bucket is fillable to be full by pushing forward and rotatable around a horizontal shaft such that the centre of gravity of the bucket transfers onto the wheelbase of the loading and transport device.

The most important advantage of the invention is that its large-sized bucket, being against the ground when in the loading position and rotatable to the wheelbase of the vehicle, can be filled first half-way full by pushing forward, after which, the material having shifted on top of the bottom and the panel is lifted and shifted by the rotating motion of the panel to the rear part of the bucket and, next, the emptied bucket bottom part is filled without obstructions by transferring the bucket forward, whereby the large bucket is full of material.

The invention provides the following practically important advantages.

The good loading characteristics of the bucket due to its long bottom and the lifting and rotating of the material by the panel provides the fact that a large-sized bucket can be quickly filled full when the material is shifted by the rotating panel to the rear part of the bucket and the centre of gravity of the load can be transferred onto the wheelbase of the machine, which provides the machine with good transport characteristics.

The load in the bucket can be of the quantity of the machine weight. Such a load can be provided by the device according to the invention when the load with other devices filling the bucket by pushing, such as wheel loaders, is about a third of the machine weight due to the disadvantageous location of the load outside the wheelbase.

Large bucket-sized pieces can be loaded in the bucket.

DESCRIPTION OF THE DRAWINGS

The invention will now be described in more detail with reference to the accompanying drawings.

FIGS. 1-4 show a vehicle 1, a bucket 2, arms 3a and 3b, a pivot 4 between the arm 3b and the bucket 2, a shaft 5, a vehicle frame structure 6, first power units 7, second power units 8, a panel 9, pivots 10, an arm 11 and a third power unit 12.

Figure 1:
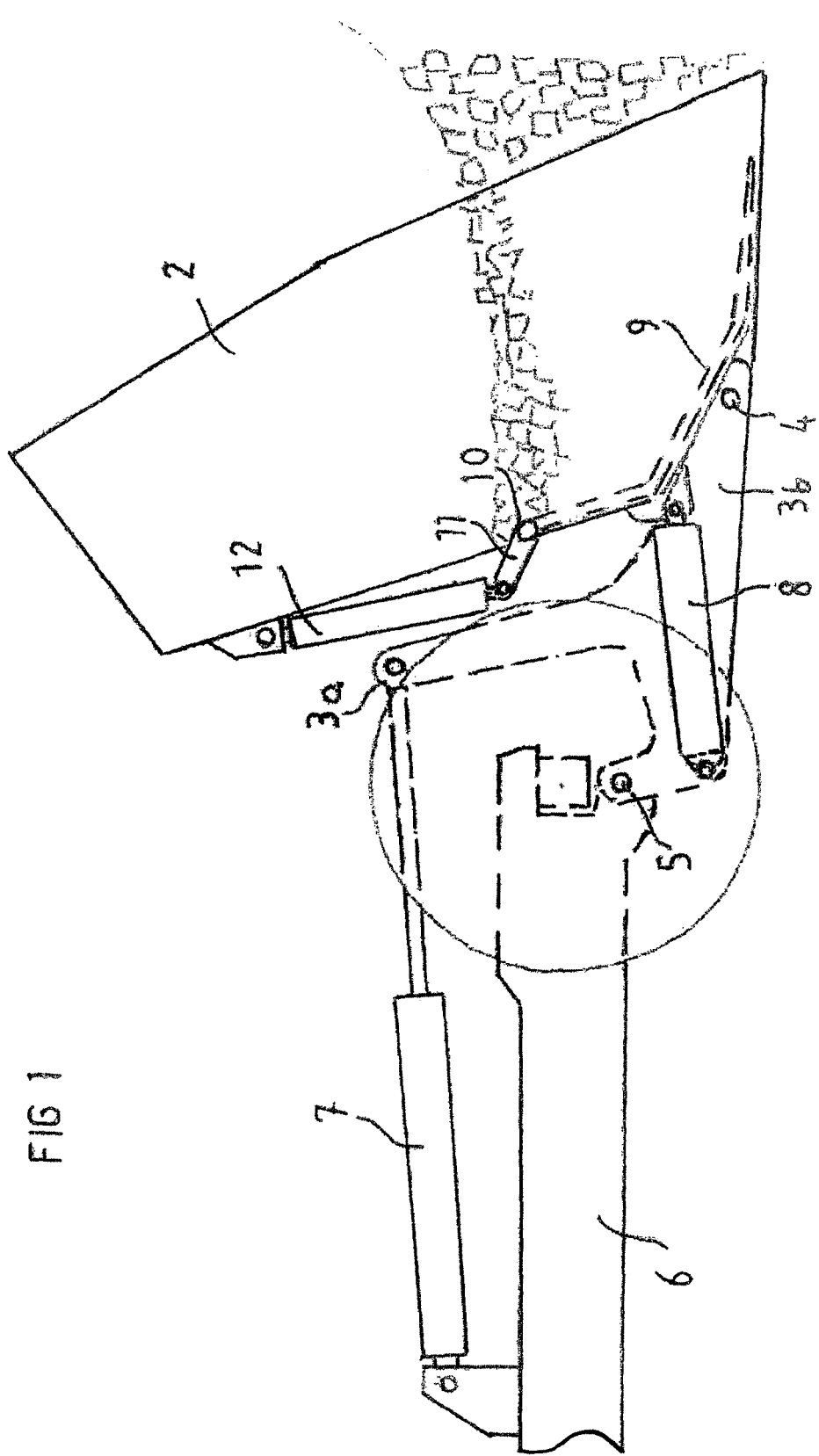
FIG. 1 shows a side view of the rear part of a vehicle in which a bucket is in a loading position and the bottom part of the bucket is filled with material by transferring the bucket forward and a rotating panel is against a bottom panel in a rotated position.

The bucket 2 includes a rear part, side parts on its sides and a bottom between them. In this case, the bottom includes a mainly even bottom part and an inclined part connected to it, being at an angle in relation to the bottom part, and a tip part connected to it, being at an angle in relation to the inclined part. The panel 9 is articulated inside the bucket in the middle of the bottom and its shape corresponds that of the bottom part, the inclined part and partially also the tip part of the bucket. In front of the panel, there are the front part of the bucket bottom and, on its other side, the rear part of the bucket bottom.

The first power units 7, second power units 8 and third power units 12 shown in the figures are hydraulic cylinders but it is also possible to use other suitable power units. The first power units 7 are fastened from their one end to the frame structure of the vehicle and from their other end to the arms 3a. The second power units 8 are fastened from their one end to the arms 3b and from their other end to the bucket 2. The third power units 12 are fastened from their one end to the bucket 2 and from their other end to the arms 11 which are connected to the panel 9.

Figure 2:
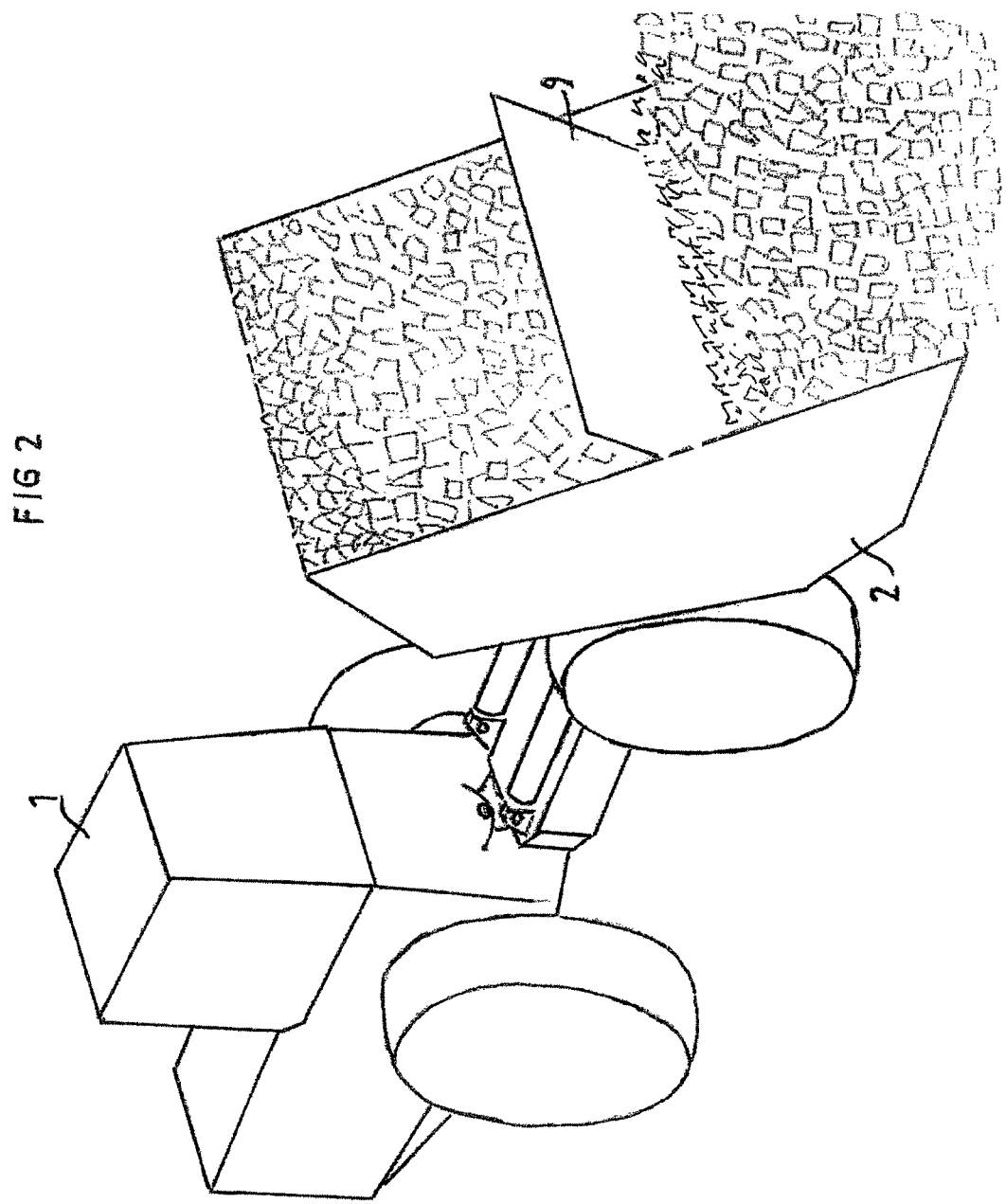
FIG. 2 shows an axonometric view of a vehicle in which a device according to the invention has shifted material to the rear part of a bucket and the front part of the bucket is filled with material by transferring the bucket forward.
Figure 3:
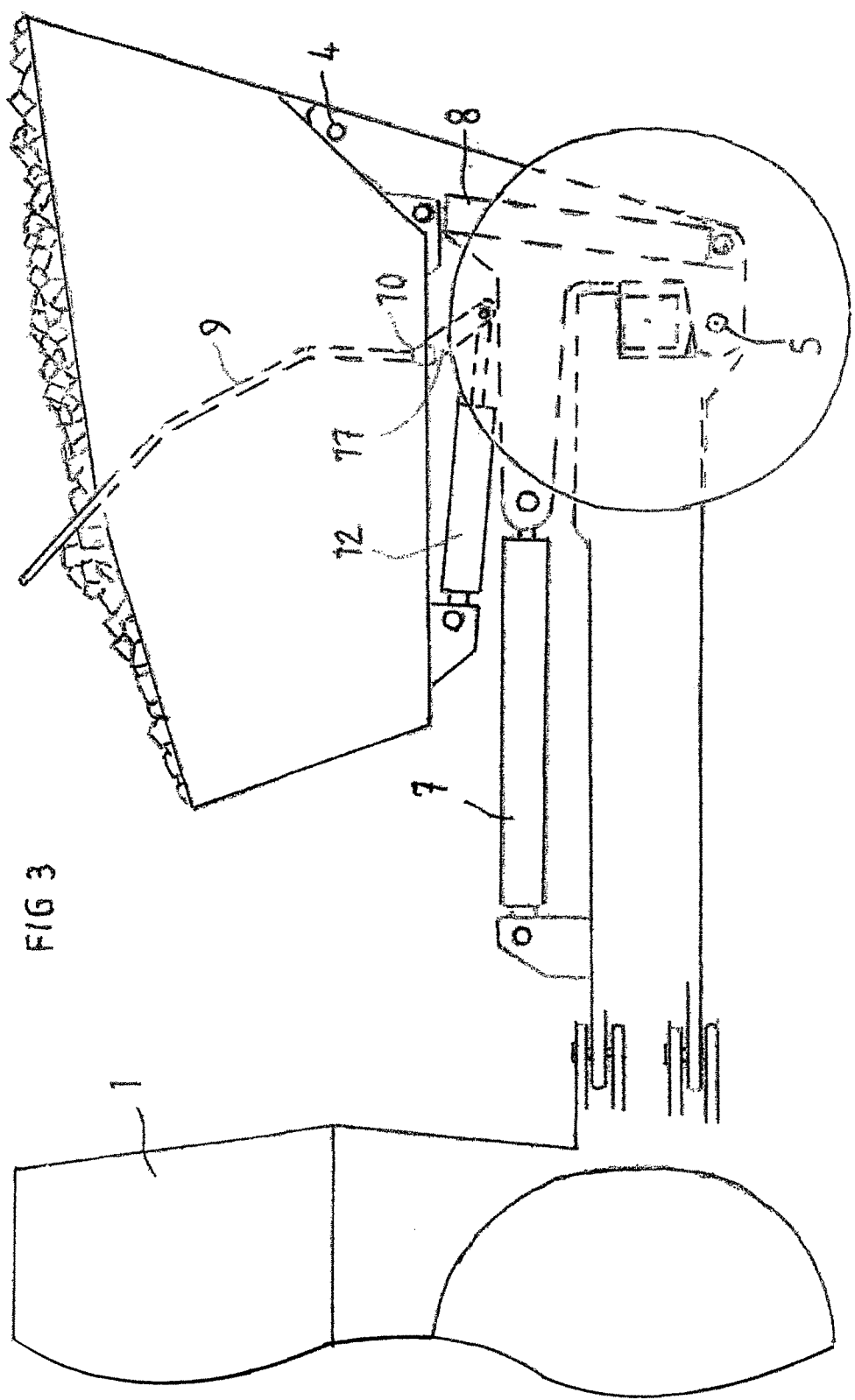
FIG. 3 shows a side view of a vehicle in which a bucket filled full with material has been rotated into a transport position.
Figure 4:
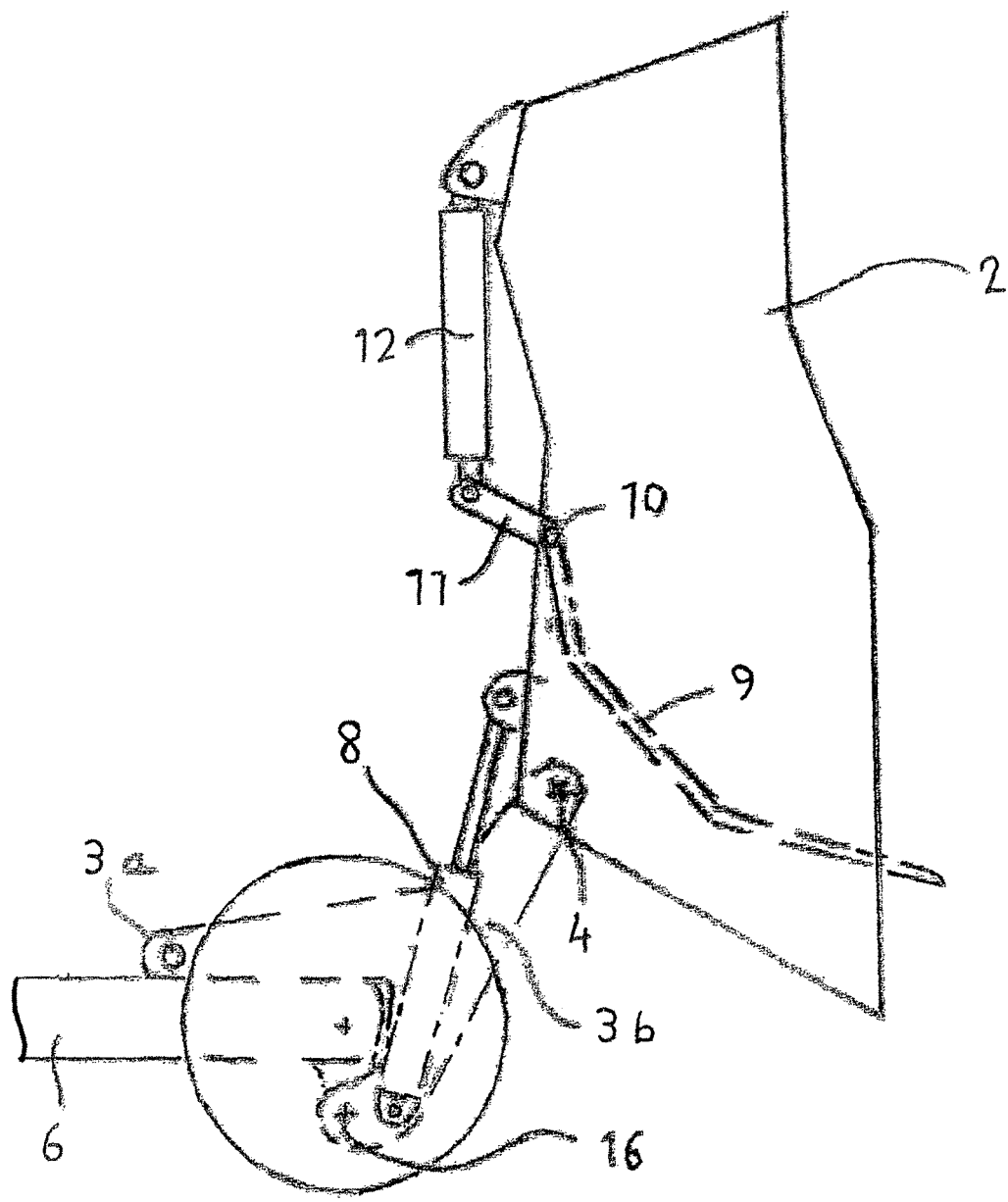
FIG. 4 shows a side view of the rear part of a vehicle in which the bucket is in an emptying position.

FIGS. 1-4 shows the vehicle 1, in which, to the rear part of the frame structure 6 are articulated the arms 3a rotatable around the substantially horizontal shaft 5 by the first power units 7 and to the second arms 3b is connected by the pivots 4 the bucket 2 such that, when the arms 3a and 3b are pulled by the first power units 7 into a transport position shown in FIG. 3, the bucket is rotatable by the second power units 8 around the pivots 4 into an emptying position shown in FIG. 4. The bucket can also be rotated around the pivots 4 in the other positions of the arms 3a and 3b.

In the middle part of the bottom of the bucket 2 is connected the panel 9 which is rotated around the pivots 10 by the arm 11 which is rotated by the third power units 12.

According to FIG. 1, the bucket 2 has been lowered into a loading position and the panel 9 is substantially against the front part of the bucket bottom and allows thus the material to shift without obstructions to the bucket 2. When transferring the bucket forward, the amount of material being shifted to the bucket is increased by the fact that the bucket bottom is long and that the pivot points 5 are low whereby, when lifting the tip part of the bucket above the pivot point, the penetration force of the bucket to the material increases thus providing more efficiency for loading also more difficulty detachable material to the bucket.

When lifting the tip of the bucket 2, the position of the bucket becomes better for the material to shift towards the middle part of the bucket.

According to FIG. 2, the material in the half-way full bucket 2 has been shifted by rotating the panel 9 around the pivot 10 from the front part of the bucket to the rear part of the bucket. Next, the vehicle 1 and the bucket 2 will be transferred forward in the loading position, whereby the front part of the bucket is filled with the material.

An alternative work method is to fill the front part of the bucket by transferring the vehicle 1 and the bucket 2, after which, the bucket is rotated into the transport position and the panel 9 is rotated into the rear position and the panel thus shifts the material to the rear part of the bucket. Then, the bucket is rotated again to the loading position and the other half of the bucket is loaded by transferring the machine backwards, after which, the bucket is rotated into the transport position.

FIG. 3 shows the bucket in the transport position in which the centre of gravity of the load has transferred onto the wheelbase when the material on top of the panel 9 has been shifted to the rear part of the bucket.

FIG. 4 shows the bucket in the emptying position.

Figure 5:
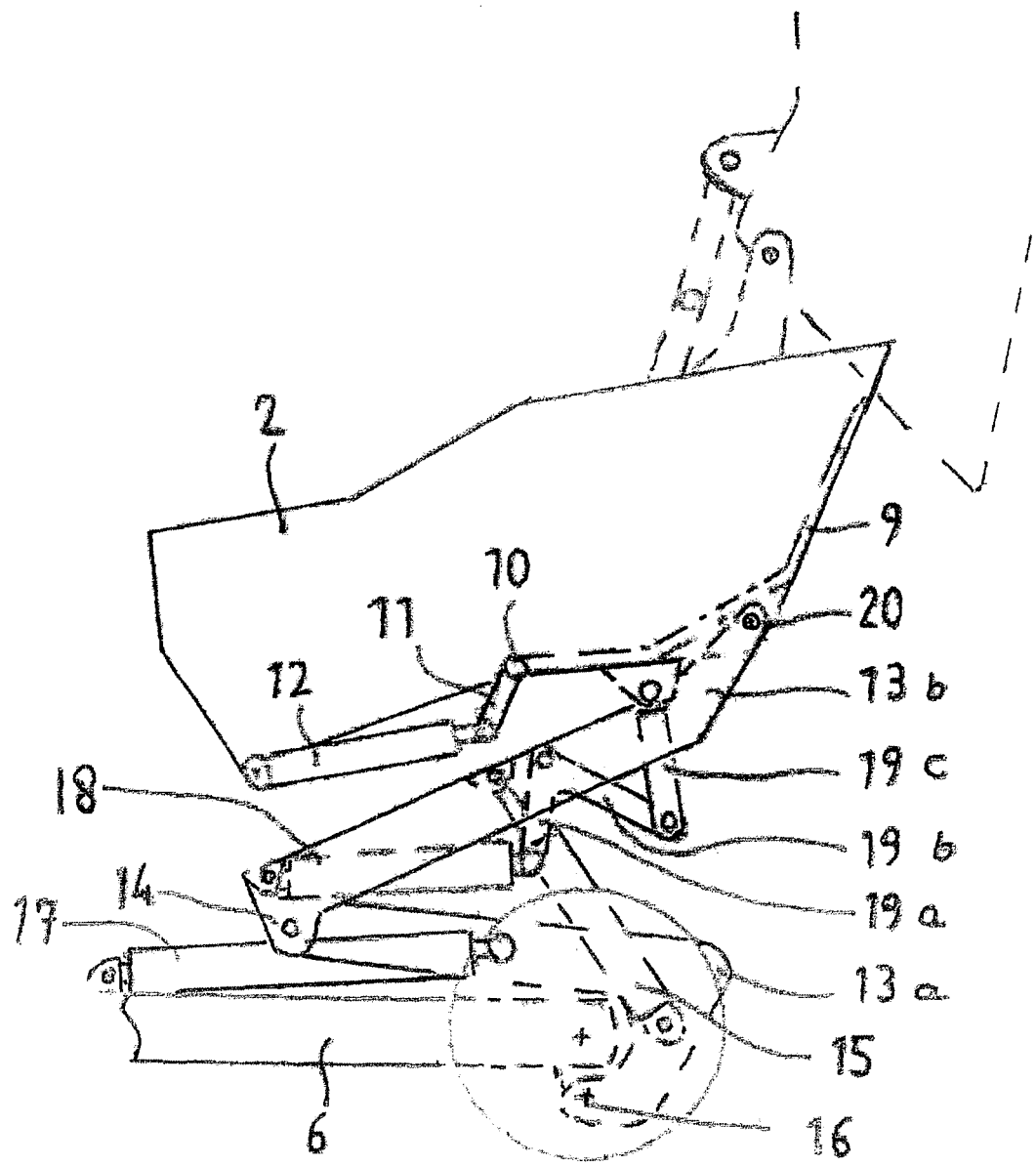
FIG. 5 shows a side view of an arm structure of the vehicle, by means of which, a bucket provided with a structure according to the invention can be lifted up when loading another vehicle.

FIG. 5 shows the lifting of the bucket to another vehicle for loading. To the bucket 2 are attached two-piece arms 13a and 13b which are connected by pivots 14 to each other and the arms 13b are rotated in relation to the arms 13a by additional power units 15. The arms 13a are connected to the frame 6 by pivots 16 and the arms 13a are rotated by fourth power units 17. To rotate the bucket 2 in relation to the arms 13b is used a fifth power unit 18 via additional arms 19a, 19b and 19c around a pivot 20.

The invention is not limited to the embodiments shown in the description and the drawing, but it can be varied within the scope of the disclosure.

The invention claimed is:

1. A device for filling a bucket in a loading and transport device, the device comprising:
    articulated arms rotatable around a horizontal shaft by a first power unit;
    second arms attached with a bucket by first pivots such that, when the articulated arms and the second arms are pulled to a transport position by the first power unit, the bucket is rotatable by a second power unit around the first pivots into an emptying position, wherein a middle part of the bucket is connected via a second pivot to a panel having a bottom edge with fastened arms which are rotatable by a third power unit, the panel being positioned against a bottom of the bucket and against a front wall of the bucket, such that material will shift when the bucket is pushed forward without obstructions to the bucket, the panel being rotatable by the third power unit, whereby the panel is arranged to lift and shift material on top of the panel to a rear part of the bucket, after which, a front part of the bucket bottom is substantially empty, the bucket being configured to be fillable to be full by pushing forward and rotating around the horizontal shaft such that a centre of gravity of the bucket is configured to transfer onto a wheelbase of the loading and transport device.

2. The device according to claim 1, in combination with a loading and transport device having a frame structure.

3. The device according to claim 1, wherein the middle part is connected to a bottom of the bucket, and the bucket is configured to be approximately half-way full when lifting and shifting material placed on a top of the panel.

4. A device for filling a bucket in a loading and transport device, which device comprises:
    arms, a horizontal shaft, a bucket, a panel;
    first arms configured to be articulated to a rear part of a frame structure;
    second arms rotatable around the horizontal shaft by first power units;
    a bucket attached to the second arms by first pivots such that when the second arms have been pulled to a transport position by the first power units, the bucket is rotatable by second power units around the first pivots into an emptying position;
    a panel connected to a middle part of a bottom of the bucket via a second pivot, a bottom edge of the panel having arms which are fastened to be rotatable by third power units such that the panel can be positioned against the bottom of the bucket and against a front wall of the bucket, wherein:
    the device is configured to shift material when the bucket is pushed forward without obstructions to the bucket, the panel being rotatable by the third power units around the second pivot located at the middle of the bucket; and
    the device is arranged to lift and shift material on top of the panel to a rear part of the bucket, after which, a front part of the bucket bottom is empty, and the bucket is fillable by pushing forward and rotating around the horizontal shaft such that a centre of gravity of the bucket transfers onto a wheelbase of the loading and transport device.

5. A device according to claim 4, comprising:
plural additional arms attached to the bucket, which plural arms are connected by third pivots to each other, a first of the plural additional arms being arranged rotatable in relation to a second of the plural additional arms by fourth power units.

6. A device according to claim 4, wherein the first arms are configured to be attached to the frame structure by fourth pivots, and arranged to be rotatable by the first power units.

7. A device according to claim 6, wherein rotation of the bucket in relation to the first and second arms is respectively arranged by the first and second power units for rotation around first and fourth pivots.

8. A device according to claim 4, the first arm being arranged rotatable in relation to the second arm by additional power units, the first arm configured to be attached to the frame structure by pivots, the first and second arms being arranged rotatable by a fourth power unit, and rotation of the bucket in relation to the second arm being performed arranged by a fifth power unit via additional arms around pivots.

9. The device according to claim 6, in combination with a loading and transport device having the frame structure.

* * * * *